No. 687,554. Patented Nov. 26, 1901.
A. W., J. A. & H. N. BRAY.
COUPLING FOR RAILWAY CARRIAGES, WAGONS, &c.
(Application filed July 21, 1900.)
(No Model.) 3 Sheets—Sheet 3.
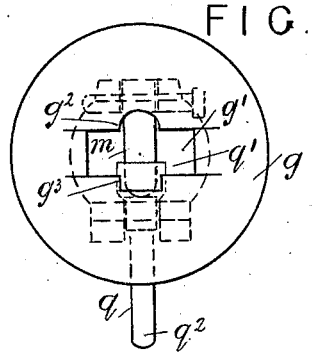
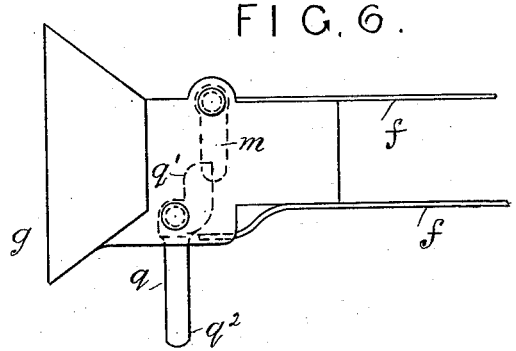
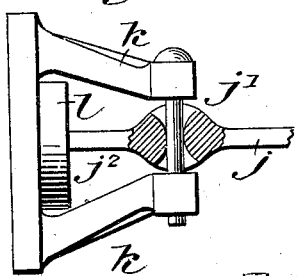
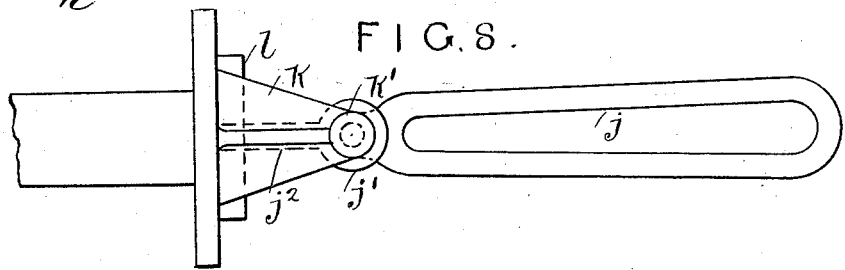
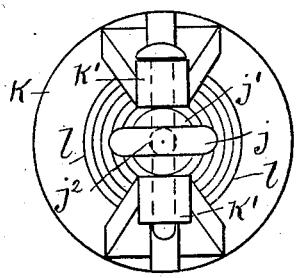

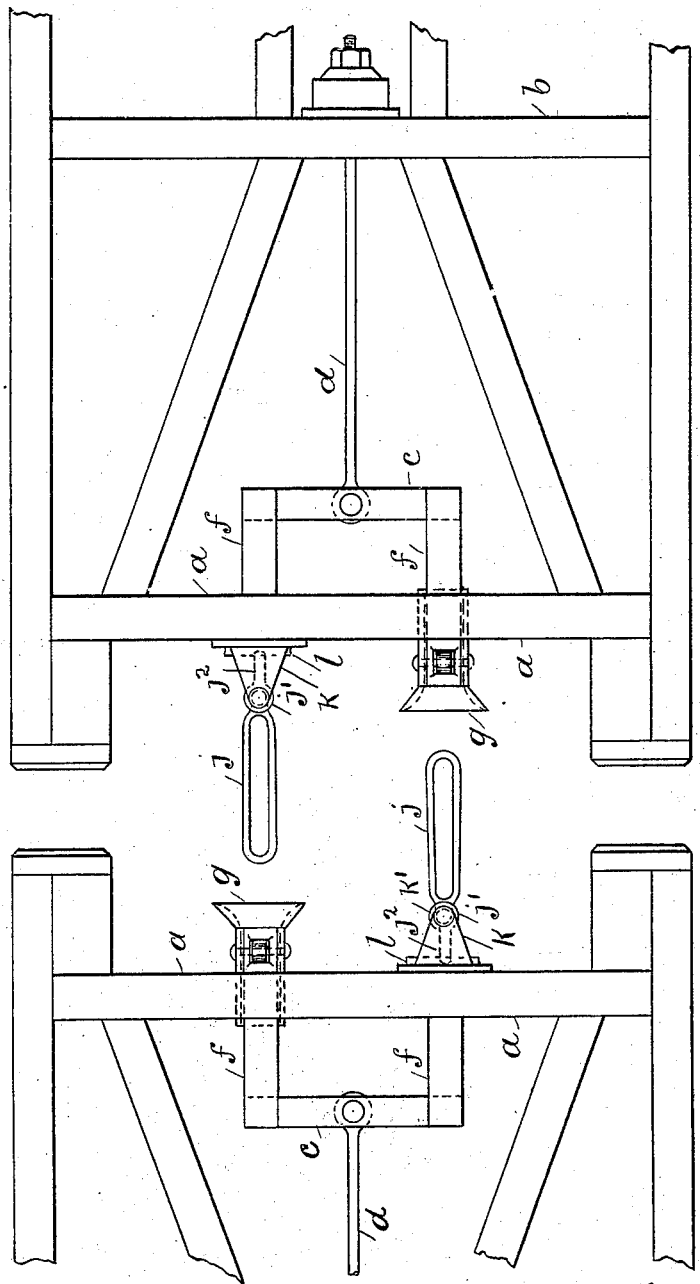

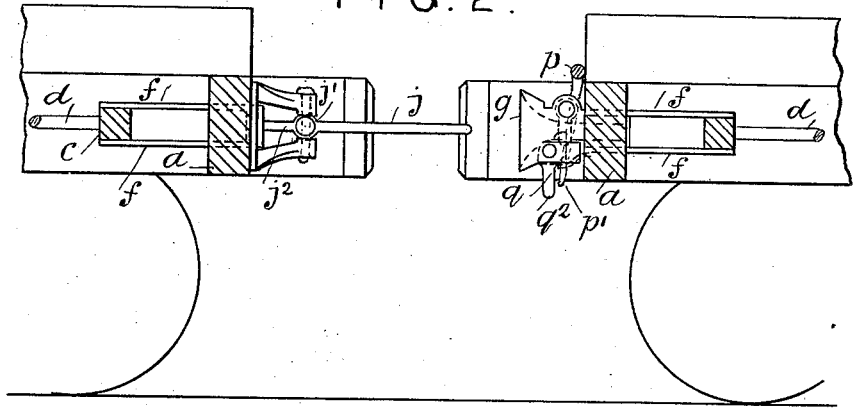
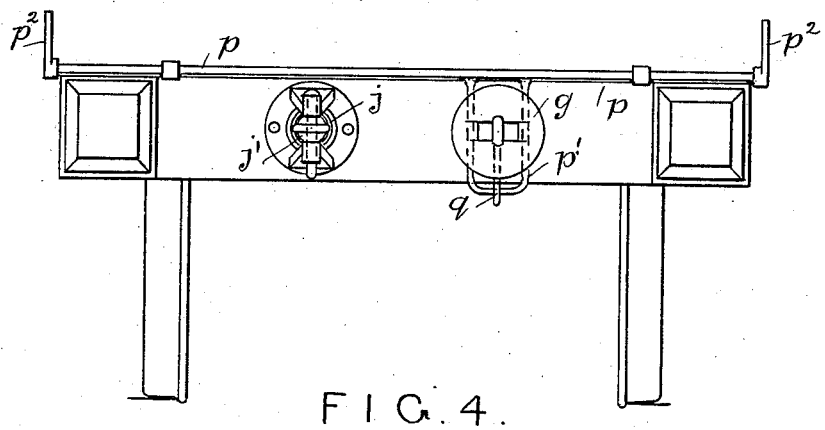
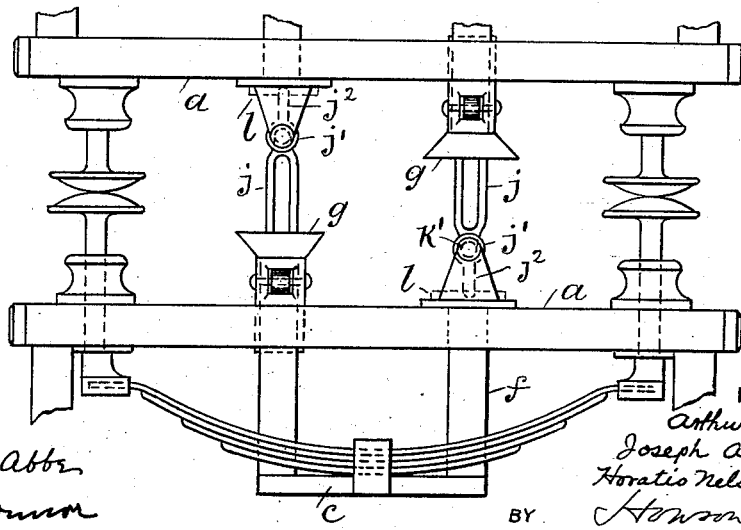

UNITED STATES PATENT OFFICE.

ARTHUR W. BRAY, JOSEPH A. BRAY, AND HORATIO NELSON BRAY, OF ASHTON-UNDER-LYNE, ENGLAND, ASSIGNORS OF ONE-THIRD TO THOMAS COOK, OF ASHTON-UNDER-LYNE, ENGLAND.

COUPLING FOR RAILWAY-CARRIAGES, WAGONS, &c.

SPECIFICATION forming part of Letters Patent No. 687,554, dated November 26, 1901.

Application filed July 21, 1900. Serial No. 24,404. (No model.)

*To all whom it may concern:*

Be it known that we, ARTHUR WELLESLEY BRAY, JOSEPH ALFRED BRAY, and HORATIO NELSON BRAY, subjects of the Queen of Great Britain and Ireland, residing at Welbeck street, Ashton-under-Lyne, in the county of Lancaster, England, have invented new and useful Improved Couplings for Railway-Carriages, Wagons, and Like Vehicles, of which the following is a specification thereof.

This invention relates to improved means for coupling railway-carriages, wagons, and like vehicles, with the object of enabling said vehicles to be automatically coupled when run together and to be uncoupled from the side of the frame in order to avoid the necessity for those who may be engaged in making up a train or shunting or at other times to pass in between the buffers or the ends of the vehicles, or if not required to be coupled to render the coupling mechanism inoperative.

In the accompanying three sheets of drawings, Figure 1 is a plan of the end portions of two wagons in proximity to each other to which our invention is shown applied. Fig. 2 is a sectional elevation of the same. Fig. 3 is an end view of one of the aforesaid wagons. In these views the draw-bar is arranged to pass through the cross-bar and is fitted with a coil of india-rubber spring in the ordinary manner. Fig. 4 is a plan representing the ends of two vehicles coupled. In this view spring-buffers with laminated buffing-springs are shown. Fig. 5 is a front view, Fig. 6 a side view, and Fig. 7 a longitudinal section, of the socket portion of our improved draw-gear. Fig. 8 is a plan, Fig. 9 an end view, and Fig. 10 is a side elevation showing the ball enlargement in section, of the link portion of said gear.

In the views similar letters refer to similar parts.

For the purposes of this invention we connect a short transverse bar or saddle-piece $c$ to the draw-bar $d$, preferably between the head-stock $a$ and the cross-bar $b$, forming a part of the underframe of a wagon if the wagon is constructed with dead-buffers, as shown at Figs. 1, 2, and 3, or connect said saddle-piece to a laminated buffing-spring, as $e$, if spring-buffers are employed, as shown in Fig. 4. We attach to each end of the aforesaid short transverse bar or saddle-piece $c$ a longitudinal bar or bars, as $f$, which we pass through the head-stock, and fit thereto at each side of the center line of the vehicle a trumpet-shaped socket $g$ and a draw-link $j$, respectively. Said socket and draw-link are placed in reverse positions at each end of the vehicle, so that when two vehicles meet the link $j$ of one vehicle comes opposite the socket $g$ of the other. The draw-link $j$ has a short rod $j^2$ projecting at the inner end, on which a swell or ball enlargement $j'$ is formed, with a hole through the ball of greater width at the top and bottom than at the center, as shown in Fig. 10, which is fitted in a bracket $k$, placed on the outside of the head-stock $a$ and connected with the aforesaid saddle-piece $c$. Said bracket is formed with jaws $k'$, between which the ball $j'$ is placed and retained therein by a pin, so that a form of universal joint is obtained by which the free end of the link is enabled to be diverted from its ordinary horizontal position. The inner end of the short rod $j^2$ is retained in a coil or like spring, as $l$, that is fitted in the base of the bracket $k$, by which the link is retained in a position at right angles with the head-stock; but if diverted therefrom by not meeting the trumpet-shaped socket on the adjacent vehicle fairly in the center or from other impediment it is placed out of the rectangular position. Said link will when the diverging force is removed be caused by said spring to return to the rectangular position.

The trumpet-shaped socket $g$, to which reference has hereinbefore been made and shown drawn to an enlarged scale in Figs. 5, 6, and 7, has a horizontal recess $g'$ formed in its base for the reception of the draw-link $j$, and vertical grooves $g^2$ and $g^3$, respectively, in the top and bottom of said recess, with a pin $m$, depending from the top groove $g^2$, so arranged that the lower or free end of said pin can be pushed back into the socket by the link $j$ when the link enters the socket and fall within the link $j$, but cannot be drawn forward as the lower end of the depending pin engages with the shoe end $q'$ of the pin $q$, that is suspended in the bottom groove $g^3$, and which can only be pushed inward, the part $q'$ resting against a shoulder $q^4$, formed in the groove $g^3$, when said pin is in a vertical position. The lower end of the pin $q$ projects below the socket, and the shoe end $q'$ of the pin may be placed out of contact with the pin $m$ by the lever $p'$ pushing forward the lower end of the pin $q$, as shown in dotted lines, so that the pin $m$ may hang freely and be moved either inward or outward without retaining the draw-link.

When a vehicle with our invention applied is propelled and meets another vehicle fitted with a like appliance, the link $j$ on one vehicle will enter the socket $g$ on the adjacent vehicle and push back the bottom end of the upper suspended pin $m$, which will then fall into and retain the link $j$ within the socket $g$, as shown in Fig. 4. When the vehicles are required to be uncoupled, the cross rod or bar $p$ is turned by the handle $p^2$ or an equivalent, which causes the lever $p'$, fitted on the cross-rod $p$, to push forward the tail $q^2$ of the pin $q$ and set free the lower end of the pin $m$, enabling the link $j$ to be withdrawn. When shunting or at times when it is required to run the wagons together without being coupled, the pin $q$ is retained at an angle in the position shown by dotted lines on the drawings by the lever $p'$ being kept in the required position by a spring acting on said lever or other equivalent.

When vehicles having our improved couplings applied are required to run in connection with vehicles that are not so fitted, a draw-hook and coupling of the ordinary pattern may be additionally fitted to the vehicle in the usual manner.

We claim as our invention—

1. In a coupling for railway-carriages, wagons and like vehicles, a head-stock and a bracket on the head-stock, in combination with a link having a ball enlargement by which it is secured in the bracket and at which point it is adapted to be universally rotated, and a coiled spring secured to the bracket and to the link near the ball enlargement to keep the link in a normally horizontal position and at right angles to the head-stock, and a socket to receive the link.

2. In a coupling for railway-carriages, wagons and the like, a head-stock and a bracket on the head-stock, in combination with a link having a ball enlargement near one end, by which it is secured to the bracket and at which point it is adapted to be universally rotated, and a projection on the link on that side of the ball enlargement toward the head-stock, a coiled spring secured to the bracket and to the said projection to keep the link normally in a horizontal position at right angles to the head-stock, and a socket to receive the link.

3. A coupling for railway-cars having a trumpet-shaped socket, an opening in the bottom thereof, a pin pivoted to the top of the socket, a second pin pivoted to the bottom and inside of the socket and having two projections, an upper one adapted to limit the forward movement of the first-named pin and a lower projection extending through the opening in the bottom of the socket, adapted to act as a weight to insure a vertical position of the pin, both said pins being adapted to operate to couple by their own weight alone, in combination with a rod having a part $p'$ normally out of contact with, but adapted to be operated to abut upon said lower projection to throw it out of said vertical position, as and for the purpose set forth.

In testimony whereof we have signed our names to this specification in the presence of two subscribing witnesses.

ARTHUR W. BRAY.
JOSEPH A. BRAY.
HORATIO NELSON BRAY.

Witnesses:
GEORGE DAVIES,
JNO. HUGHES.